United States Patent
Ishida

[15] 3,695,570
[45] Oct. 3, 1972

[54] ADJUSTABLE RECLINING SEAT
[72] Inventor: Hideo Ishida, Tokyo, Japan
[73] Assignee: Nissan Motor Company, Limited, Yokohama, Japan; Fuji Kiko Company, and Ikedo Brissan Company, Limited, Yokohama, Japan
[22] Filed: Oct. 19, 1970
[21] Appl. No.: 81,806

[30] Foreign Application Priority Data
    Oct. 22, 1969    Japan .................. 44/100103

[52] U.S. Cl. ................................. 248/397
[51] Int. Cl. ................................. B60n 1/02
[58] Field of Search ...... 248/371, 398; 297/366, 367, 297/370

[56] References Cited
    UNITED STATES PATENTS
    2,594,882    4/1952    De Rose ................. 248/394
    2,609,029    9/1952    Haberstump ............. 248/394
    2,795,267    6/1957    Williams ................. 248/394
    2,892,483    6/1959    De Rose ................. 248/394

FOREIGN PATENTS OR APPLICATIONS
    330,727    6/1930    Great Britain ............ 297/367

*Primary Examiner*—Marion Parsons, Jr.
*Attorney*—John Lezdey

[57] ABSTRACT

An adjustable reclining seat for major use in a motor vehicle, comprising a seat structure and support structure carrying the seat structure, the support structure including a latch mechanism which is adapted to finely adjust the tilting angle of the seat structure through manipulation of a lever which is manually operated.

3 Claims, 3 Drawing Figures

PATENTED OCT 3 1972　　　　　　　　　　　　　　　3,695,570

INVENTOR
HIDEO ISHIDA
BY
ATTORNEY

ADJUSTABLE RECLINING SEAT

This invention relates to an adjustable reclining seat and, more particularly, to a reclining seat which can be tilted and locked in a desired angular position. The seat to which the invention is directed may preferably be mounted on a motor vehicle.

The conventional reclining seat usually uses a device by which the seat structure to carry a vehicle occupant thereon is tilted in two or three or even more ways depending upon the statute of the vehicle occupant such as the driver. Because, thus, the angular position of the seat structure relative to the vehicle floor is adjusted in a stepwise fashion, it is difficult to hold the seat structure in an angular position which is optimum for the vehicle occupant.

An object of this invention is to provide an adjustable reclining seat which can be adjusted in its angular position finely to conform to the statute of the vehicle occupant and can be locked securely once the selected angular position of the seat structure is reached.

Figure 1:
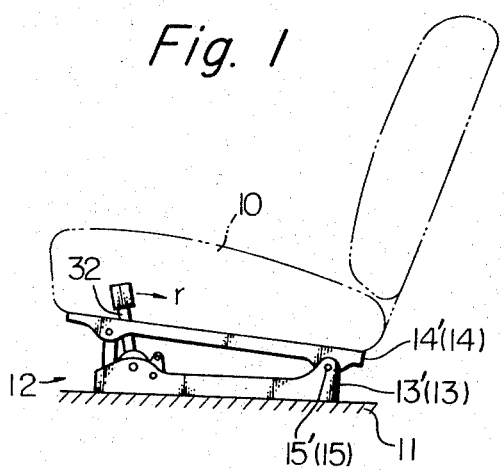
FIG. 1 is a side elevation of an adjustable reclining seat according to the invention.
Figure 3:
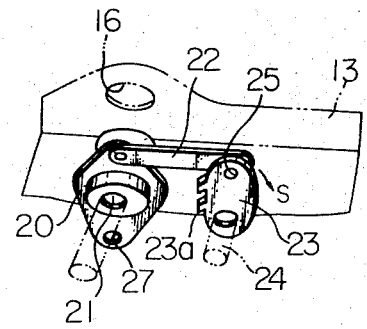
FIG. 3 is a perspective view showing, on a further enlarged scale, those parts of the support structure which are not seen in FIG. 2.

Referring now to the drawings, there is shown an adjustable reclining seat having a usual seat structure 10 which is indicated in phantom in FIG. 1. The seat structure 10 is supported on a floor pan 11 of a motor vehicle (not shown) by a support structure which is generally denoted by 12.

The support structure 12 includes right and left lower brackets 13 and 13', respectively, which are fixed on the floor pan 11. The brackets 13 and 13' are pivotally connected at their upturned rear end portions to right and left upper brackets 14 and 14' by pivot pins 15 and 15', respectively. The lower brackets 13 and 13' have formed in their upturned front end portion apertures 16 and 16', respectively, through which a shaft 17 is pivotally inserted whereby the brackets 13 and 13' are connected to each other.

A latch mechanism is provided, including a rotary member 18 which is securely mounted through an aperture 19 on the shaft 17 adjacent the inside wall of the lower bracket 13. The rotary member 18 comprises a ratchet sector 18a directed toward the rear end portion of the bracket 13 and an outwardly extending arm portion 18b extending toward the front end portion of the bracket 13. The rotary member 18 may be secured to the shaft 17 in any desired manner such as by welding or by locking through splined engagement but is herein shown to be fixed thereon through formation of a flattened recess 17a on the shaft 17 and a correspondingly flattened edge of the aperture 19 through which the shaft 17 is inserted. The rotary member 18 is thus rotatable with the shaft 17. An actuating member 20 is rotatably mounted on the shaft 17 through an aperture 21 formed in the plate 20. The actuating member 20 is pivotally connected at its upper end portion to a connecting arm 22 which is substantially parallel to the bracket 13. The actuating member 20 and the connecting arm 22 may be interposed between the inside wall of the bracket 13 and the roatry member 18, as partially seen in FIG. 2. A pivotal member 23 is mounted pivotally on the inside wall of the bracket 13 through a pivot pin 24 and is pivotally connected at its upper end portion with the connecting arm 22. The connecting arm 22 is thus pivotally connected at its front end portion with the actuating member 20 and at its rear end portion with the pivotal member 23 so that the rotation of the actuating member 20 about the shaft 17 is followed by the corresponding rotation of the pivotal member 23 through the connecting arm 22. The pivotal member 23 has on its front side a ratchet portion 23a which is toothed in correspondence with the ratchet sector 18a of the rotary member 18.

A tension spring 26 is connected at its front end to the actuating member 20 through an aperture 27 formed at the lower end portion of the member 20 and at its rear end to the bracket 13' through a spring support 28 which is fast on the inside wall of the bracket 13, whereby the lower portion of the actuating member 20 is biased toward the rear end portion of the bracket 13 and consequently the tops of the members 20 and 23 are biased in the opposite direction. The tension spring 26 thus acts to normally hold the ratchet portion 23a of the pivotal member 23 in mesh with the ratchet sector 18a of the rotary member 18 in situ.

Figure 2:
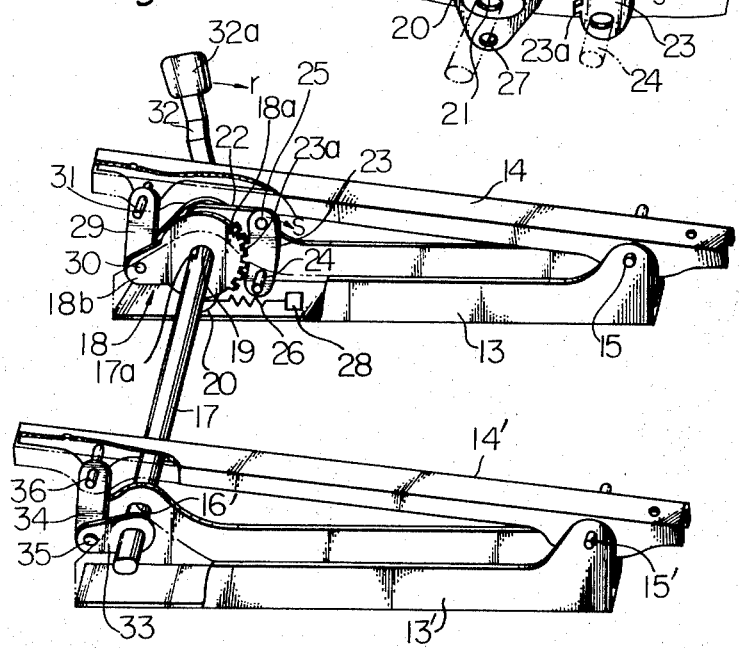
FIG. 2 is a perspective view showing, on an enlarged scale, a support structure of the seat illustrated in FIG. 1.

A linking arm 29 is pivotally connected at one end to the outwardly extending arm portion 18b of the rotary member 18 as at 30 in FIG. 2 and at the other with the inside wall of the right upper bracket 14 through a pivot pin 31. A manipulating lever 32 having a grip 32a is connected securely to the actuating member 20 which is therefore rotated as the lever 32 is operated.

The tension spring 26 and the associated parts may be removed for simplicity of construction where desired, because these are only preferably be mounted for streamlining the operation of the support structure 12 during adjustment of the relative angular position of the seat structure 10.

If desired a pivotal linkage may be provided on the left lower and upper brackets 13' and 14', respectively. Such linkage may comprise a linking arm 33 pivotally mounted on the shaft 17 at its end opposite to the right lower bracket 13 and a linking arm 34 pivotally connected at one end to the linking arm 33 as at 35 and at the other to the outside wall of the left upper bracket 14'.

If also desired, a compression spring may be mounted between the right lower and upper brackets 13 and 14, respectively, so as to permit the upper bracket 14 to be automatically tilted upwardly when the pivotal member 23 is released from the rotary member 18 through manipulation of the manipulating lever 32 for adjustment of the tilting angle of the seat structure 10. Such compression spring may be mounted between the left lower and upper brackets 13' and 14' independently or in combination with the spring mounted between the right brackets 13 and 14.

Although the latch mechanism has been herein described and shown as mounted on the righthand side of the support structure 12, the same may be mounted on the lefthand side thereof.

For the adjustment of the angle at which the seat structure 10 is tilted relative to the floor pan 11, the manipulating lever 32 is first rotated rearward, viz., in the direction of the arrow r against the action of the tension spring 26, causing the actuating member 20 to rotate accordingly about the shaft 17. The rotation of the actuating member 20 is followed by the rotation of the pivotal member 23 about the pivot shaft 24 through the connecting arm 22. The direction of the rotation of the pivotal member 23 is indicated by the arrow s. As the pivotal member 23 is thus rotated in the direction of the arrow s, the pivotal member 23 is released from the rotary member 18 which has been in engagement with the pivotal member through meshing between the ratchet section 18a and the ratchet portion 23a of the two. The rotary member 18 and accordingly the shaft 17 are now freely rotatable. In this condition, the seat structure 12 which is carried by the upper brackets 14 and 14' is tilted about the pins 15 and 15' until a desired tilting angle is reached. When the seat structure is adjusted to a desired angular position, then the manipulating lever 32 is released so as to allow the actuating member 20 to resume its initial position by the action of the tension spring 26. The pivotal member 23 is consequently rotated in the direction opposite to the direction of the arrow of s until the ratchet portion 23a thereof engages with the ratchet section 18a of the rotary member 18 in a new relative position. This will lock the seat structure 12 is its new position relative to the floor pan 11.

During adjustment of the relative position of the seat structure 12, the upper brackets 14 and 14' supporting the seat structure are associated with the shaft 17 through the linkage including the arm portion 18b of the rotary member 18 and the linking arm 29 and the linkage including the linking arms 34 and 36.

It is to be noted that the supporting structure which is constructed as hereinbefore described and shown may be used in combination with an adjusting means which is adapted to slide the seat fore and aft in the occupant's room.

What is claimed is:

1. An adjustable reclining seat comprising a seat structure and a support structure mounted on a floor pan and supporting said seat structure thereon, said support structure comprising right and left lower brackets fixed on said floor pan, right and left upper brackets which are pivotally connected to said right and left lower brackets, respectively, at their rear end portions, a shaft pivotally inserted into front end portions of said right and left lower brackets, a rotary member securely mounted on said shaft adjacent either of said right and left lower brackets, said rotary member having a ratchet sector directed rearward and an outwardly extending arm portion extending forward, an actuating member rotatably mounted on said shaft, a pivotal member pivotally mounted at its lower end portion on the lower bracket adjacent said rotary member and provided with a ratchet portion which is normally held in engagement with said ratchet sector, a connecting arm which is pivotally connected at its front end to an upper end portion of said actuating member and at its rear end to said pivotal member a linking arm which is pivotally connected at one end with the outwardly extending arm portion of said rotary member and at the other to the upper bracket associated with the lower bracket on which said pivotal member is mounted, and a manipulating lever securely connected to said actuating member, said actuating member being rotated rearward as said lever is rotated rearward to cause said pivotal member to rotate accordingly until the pivotal member is released from said rotary member.

2. A seat according to claim 1, wherein said support structure further comprises second and third linking arms, said second linking arm pivotally mounted on the end portion of said shaft opposite to said rotary member and said third linking arm being pivotally connected at one end to said second linking arm and at the other to the upper bracket adjacent said end portion of said shaft.

3. A seat according to claim 1, wherein said support structure further comprises a tension spring which is connected at one end to the lower end portion of said actuating member and at the other to the lower bracket on which said pivotal member is mounted, said tension spring biasing the lower portion of said actuating member rearward and the upper portions of said actuating and pivotal members forward.

* * * * *